US006802210B2

(12) United States Patent
Mitani et al.

(10) Patent No.: US 6,802,210 B2
(45) Date of Patent: Oct. 12, 2004

(54) FUEL PUMP MODULE AND VEHICLE FUEL TANK INTERNAL PRESSURE SENSOR

(75) Inventors: Tateki Mitani, Tokyo (JP); Shigeki Kanamaru, Tokyo (JP); Tetsushi Noda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/410,339

(22) Filed: Apr. 10, 2003

(65) Prior Publication Data

US 2004/0065144 A1 Apr. 8, 2004

(30) Foreign Application Priority Data

Oct. 2, 2002 (JP) .................................... P. 2002-289956

(51) Int. Cl.[7] ............................................... G01M 15/00
(52) U.S. Cl. ...................................................... 73/118.1
(58) Field of Search ................................ 73/116, 117.2, 73/117.3, 118.1, 119 R, 119 A; 340/438, 439, 451; 701/29

(56) References Cited

U.S. PATENT DOCUMENTS

| | | | | |
|---|---|---|---|---|
| 5,189,500 A | | 2/1993 | Kusunoki | |
| 5,335,549 A | | 8/1994 | Kato | |
| 5,440,918 A | * | 8/1995 | Oster | 73/40.5 R |
| 5,621,176 A | * | 4/1997 | Nagano et al. | 73/714 |
| 5,762,047 A | * | 6/1998 | Yoshioka et al. | 123/509 |
| 5,770,796 A | * | 6/1998 | Sakamoto et al. | 73/119 A |
| 6,065,452 A | | 5/2000 | Yoshioka | |
| 6,142,126 A | * | 11/2000 | Kanamaru | 123/509 |
| 6,260,540 B1 | | 7/2001 | Hiraiwa et al. | |
| 6,431,147 B1 | * | 8/2002 | Hiraiwa et al. | 123/458 |
| 6,598,593 B1 | * | 7/2003 | Kanamaru et al. | 123/509 |
| 6,715,471 B2 | * | 4/2004 | Hiraiwa et al. | 123/497 |
| 2002/0085930 A1 | * | 7/2002 | Hiraiwa et al. | 417/307 |
| 2004/0065147 A1 | * | 4/2004 | Mitani et al. | 73/149 |

FOREIGN PATENT DOCUMENTS

| | | |
|---|---|---|
| JP | 4-325316 | 11/1992 |
| JP | 5-149814 | 6/1993 |
| JP | 8-35900 | 2/1996 |
| JP | 11-294283 | 10/1999 |

* cited by examiner

*Primary Examiner*—Eric S. McCall
(74) *Attorney, Agent, or Firm*—Sughrue Mion, PLLC

(57) ABSTRACT

A fuel pump module is formed in such a manner that a sensor unit having a semiconductor diaphragm is provided in a recess of a bracket having a flange portion holding a fuel pump through a high-pressure filter. The recess is closed by a sensor cap having a lead-in pipe to thereby form an tank internal-pressure sensor. While internal pressure of a fuel tank is led into the tank internal-pressure sensor through an internal pressure lead-in pipe, atmospheric pressure is led into the tank internal-pressure sensor through an external air intake hole provided in the lead-in pipe. Thus, internal pressure of the fuel tank is detected.

16 Claims, 9 Drawing Sheets

FUEL PUMP MODULE AND VEHICLE FUEL TANK INTERNAL PRESSURE SENSOR

BACKGROUND OF THE INVENTION

1. Field of the Invention

The present invention relates to a fuel pump module mounted in a fuel tank, which stores fuel, and for mainly supplying the fuel stored in the fuel tank into an internal combustion engine and particularly to a fuel pump module for detecting internal pressure of a fuel tank. The invention also relates to a vehicle tank internal pressure sensor mounted in a vehicle fuel tank for detecting internal pressure of the fuel tank.

2. Description of the Related Art

In a fuel pump module according to a related art, a pressure sensor (tank internal-pressure sensor) is attached to a plate (bracket) fixed to a fuel tank body. When attaching the pressure sensor to the plate, the circumference of a tray fitted to an opening, which is defined in the plate, from a lower surface side of the plate is fixed to the plate by welding or the like. A through-hole is formed in the center of the tray. A nipple of the pressure sensor is thread-engaged with the through-hole from a front surface side of the plate by use of an internal circumferential threaded portion of the through-hole, and attached to the front surface of the plate. Lead wires for sending out pressure detected by the pressure sensor as an electric signal are connected to a signal processor while the lead wires are lumped with lead wires connected to a plurality of terminals mounted on a front surface of the plate and electrically connected to a liquid level detecting unit on a lower surface (e.g., see patent literature 1).

[Patent Literature 1]

JP-A-Hei.4-325316 (page 3 and FIGS. 2 to 5).

In the fuel pump module according to the related art, a space above the plate is occupied by the pressure sensor because the pressure sensor is disposed on the plate, especially sensor elements such as a semiconductor diaphragm and a diaphragm housing portion constituting the pressure sensor are disposed above the plate (opposite to the inside of the fuel tank). A fuel delivery pipe, a return pipe, a breather pipe, a power-supply connector, and so on, may be disposed in the space above the plate. In this condition, the degree of freedom for arrangement of these parts is lowered. In addition, the size of the bracket needs to be reduced in accordance with the requirement for reduction in size of an opening of the fuel tank. For this reason, the degree of freedom for arrangement of other parts than the tank internal-pressure sensor is lowered.

SUMMARY OF THE INVENTION

The invention is developed for solving the problems. An object of the invention is to provide a fuel pump module and a vehicle tank internal pressure sensor, which have high degree of freedom for arrangement of parts in a space above a bracket closing an opening of a fuel tank.

According to the invention, there is provided a fuel pump module including a bracket, a fuel pump, and a tank internal-pressure sensor. The bracket closes an opening of a vehicle fuel tank. The fuel pump is held in the bracket and sends out fuel stored in the fuel tank. The tank internal-pressure sensor includes a diaphragm, a housing portion, an external pressure lead-in portion, and a lead-in hole. The diaphragm is disposed in an inside of the fuel tank viewed from a principal surface of the bracket. The diaphragm receives internal pressure and external pressure of the fuel tank. The housing portion houses the diaphragm. The external pressure lead-in portion has smaller section area than the housing portion. The external lead-in portion leads the external pressure of the fuel tank into the tank internal-pressure sensor. The lead-in hole is defined in the bracket and leads one of the external and internal pressures of the fuel tank. The tank internal-pressure sensor detects the internal pressure of the fuel tank on the basis of an output of the diaphragm.

According to the invention, there is provided a fuel pump module including a bracket, a fuel pump, and a tank internal-pressure sensor. The bracket is made of an electrically insulating resin. The bracket closes an opening of a vehicle fuel tank. In the bracket, a conductive terminal is insert-molded, which has one end serving as an external connection end. The fuel pump is held in the bracket and sends out fuel stored in the fuel tank. The tank internal-pressure sensor includes a diaphragm, a power-supply terminal, a signal terminal, and a lead-in hole. The diaphragm receives internal pressure and external pressure of the fuel tank. The lead-in hole is defined in the bracket and leads one of the external and internal pressures of the fuel tank. The power-supply terminal and the signal terminal are connected to the other end of the conductive terminal. The tank internal-pressure sensor detects the internal pressure of the fuel tank on the basis of an output of the diaphragm.

In addition, according to the invention, there is provided a vehicle fuel tank internal pressure sensor including a bracket and a tank internal-pressure sensor. The bracket closes an opening of a vehicle fuel tank. The tank internal-pressure sensor includes a diaphragm, a housing portion, an external pressure lead-in portion, and a lead-in hole. The diaphragm is disposed in an inside of the fuel tank viewed from a principal surface of the bracket. The diaphragm receives internal pressure and external pressure of the fuel tank. The housing portion houses the diaphragm. The external pressure lead-in portion has smaller section area than the housing portion. The external lead-in portion leads the external pressure of the fuel tank into the tank internal-pressure sensor. The lead-in hole is defined in the bracket and leads one of the external and internal pressures of the fuel tank. The tank internal-pressure sensor detects the internal pressure of the fuel tank on the basis of an output of the diaphragm.

DETAILED DESCRIPTION OF THE PREFERRED EMBODIMENTS

Embodiment 1

Figure 1:
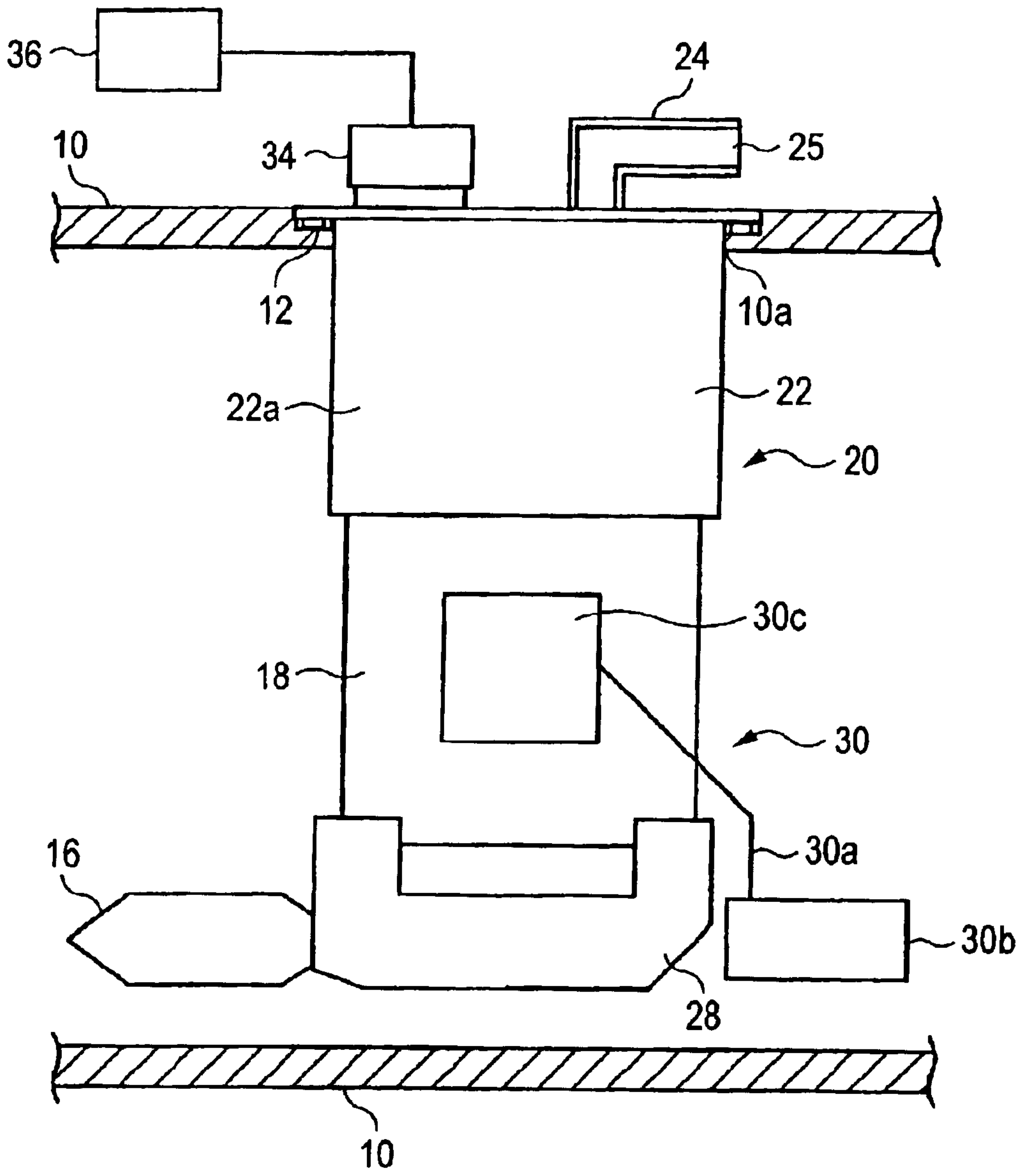
FIG. 1 is a sectional view showing a state in which a fuel pump module according to Embodiment 1 of the invention is mounted in a vehicle fuel tank.
Figure 2:
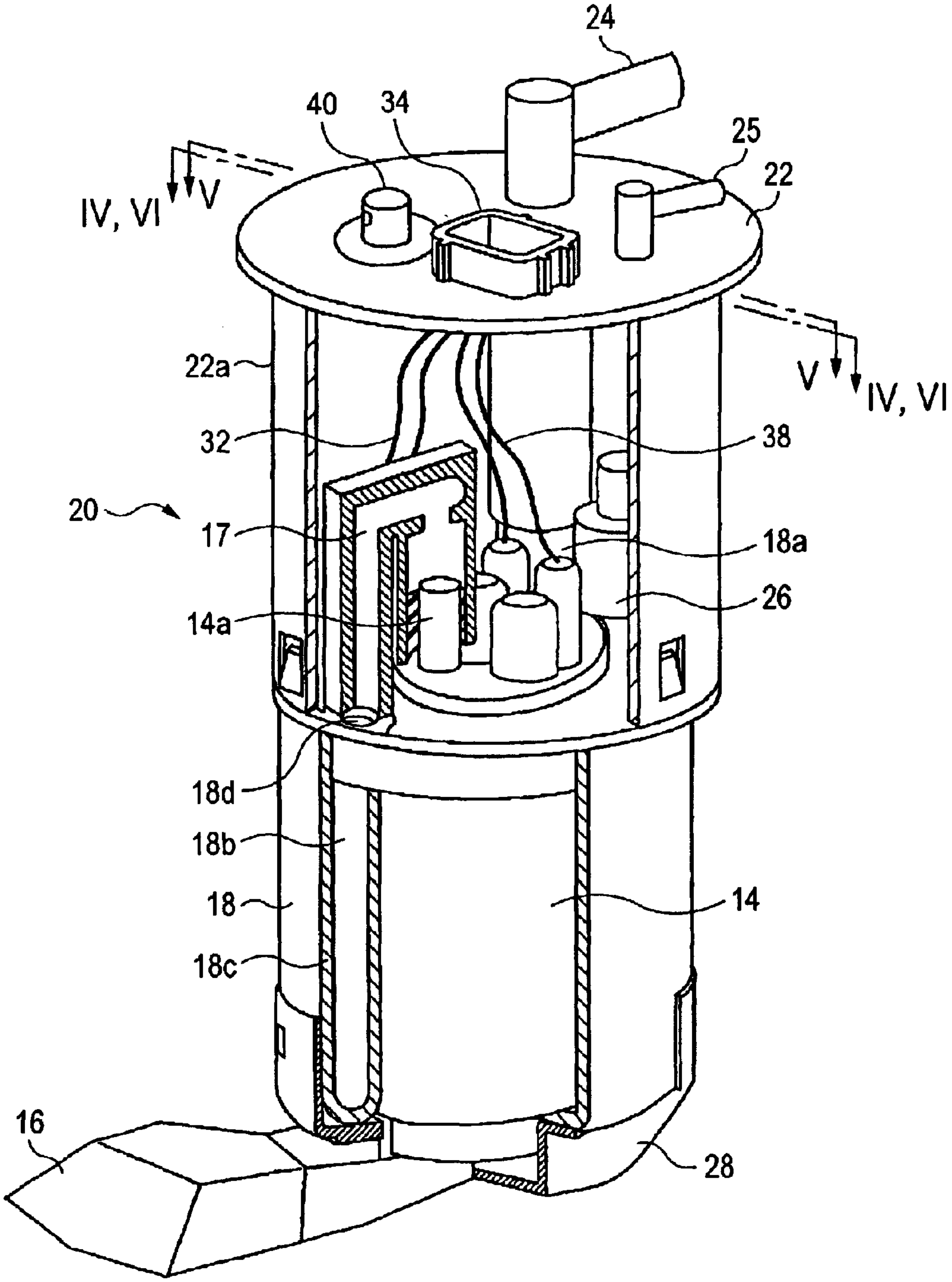
FIG. 2 is a perspective view of the fuel pump module depicted in FIG. 1.
Figure 3:
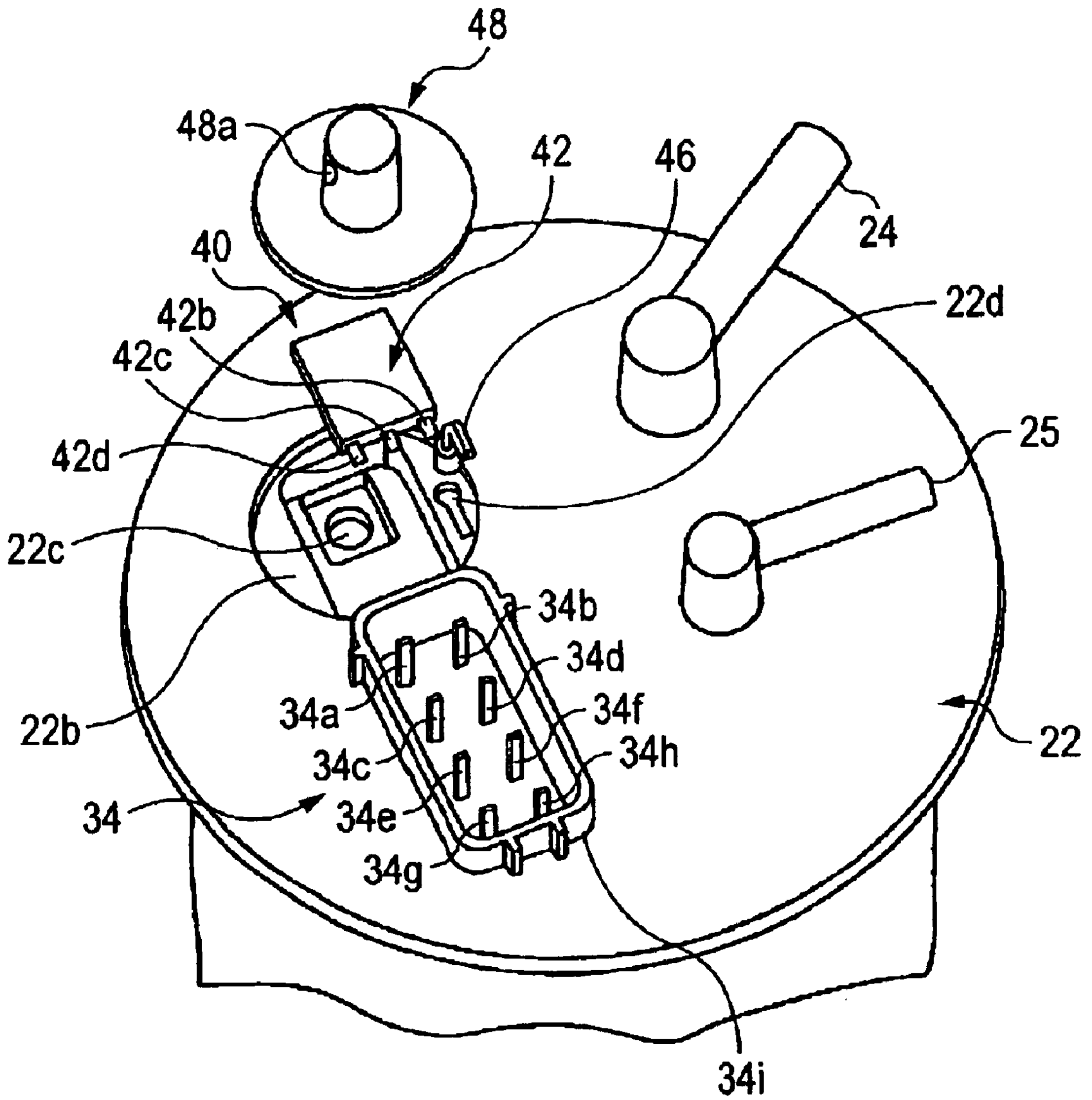
FIG. 3 is an enlarged view of an upper portion of the bracket depicted in FIG. 2 for explaining assembling of the tank internal-pressure sensor.
Figure 4:
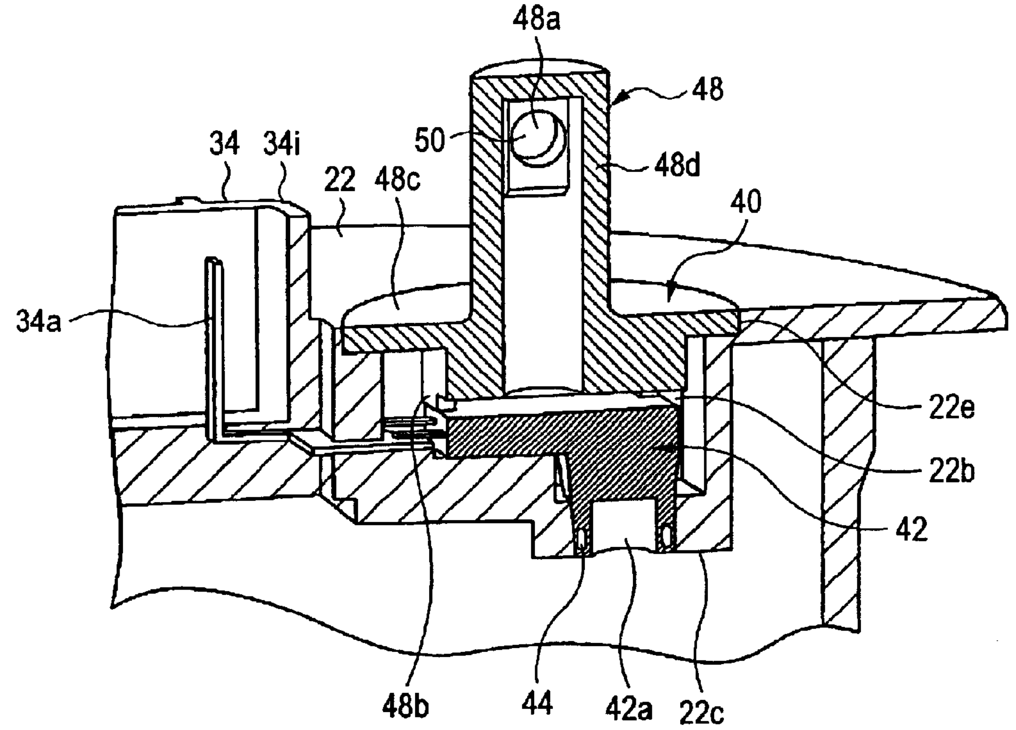
FIG. 4 is a sectional view of the bracket cut along the line IV—IV in FIG. 2.
Figure 5:
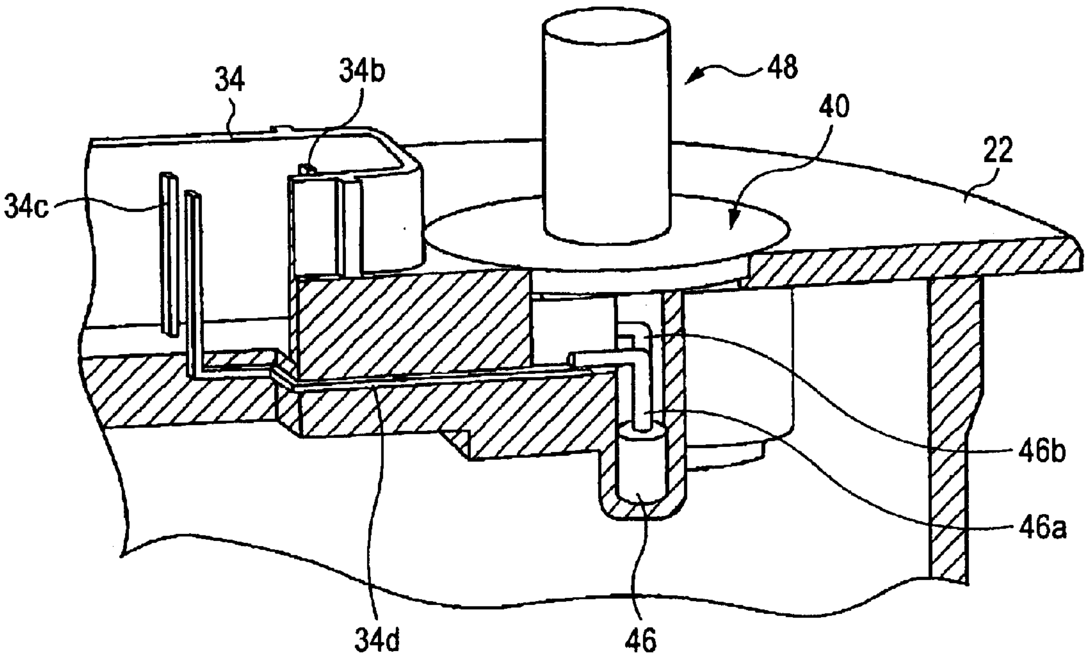
FIG. 5 is a sectional view of the bracket cut along the line V—V in FIG. 2.

Embodiment 1 of the invention will be described below. FIG. 1 is a sectional view showing a state in which a fuel pump module according to Embodiment 1 of the invention is mounted in a vehicle fuel tank. FIG. 2 is a partly cutaway perspective view showing the fuel pump module depicted in FIG. 1. FIG. 3 is an enlarged view showing an upper portion of the bracket depicted in FIG. 2 for explaining assembling of an tank internal-pressure sensor. FIG. 4 is a sectional view mainly taken along the line IV—IV, showing the bracket depicted in FIG. 2. FIG. 5 is a sectional view mainly taken along the line V—V, showing the bracket depicted in FIG. 2.

Referring to FIG. 1, a fuel pump module 20 is liquid-tightly mounted, through a gasket 12, in an opening 10*a* of a vehicle fuel tank 10 storing fuel such as gasoline. Referring to FIG. 2, a fuel pump 14 for pressurizing the fuel stored in the fuel tank 10 by its pumping action is disposed in the fuel pump module 20. When the fuel pump 14 is actuated, fuel is sucked into the fuel pump 14 through a suction filter 16. The fuel pressurized by the pumping action passes through the inside of the fuel pump 14 and further passes through a communication passage 17 from a fuel pump outlet 14*a*. After dust or the like in the fuel is filtered off by a high-pressure filter 18, the filtered fuel is delivered from a filter outlet 18*a* to an injector for jetting fuel into an internal combustion engine not shown, through a fuel pipe 24 provided in a bracket 22. A pressure regulator 26 by which the pressure of the fuel pressurized by the fuel pump 14 is kept constant is provided on an outlet side of the high-pressure filter 18.

The high-pressure filter 18 has a filter element 18*b* for filtering fuel and a filter casing 18*c* containing the filter element 18*b* liquid-tightly. A filter inlet 18*d* connected to the communication passage 17 and the filter outlet 18*a* are disposed in an upper surface (upper surface in FIGS. 1 and 2) of the filter casing 18*c*.

The fuel pump 14 is inserted in a hollow portion of the filter casing 18*c* shaped like a hollow cylinder. The fuel pump 14 is held and fixed in a pump holder 28 by which a position of an upper portion of the fuel pump 14 is fixed to the upper surface of the filter casing 18*c* while a position of a lower portion of the fuel pump 14 is fixed to the filter casing 18*c* by snap fitting.

The high-pressure filter 18 holding the fuel pump 14 is held and fixed in a flange portion 22*a* of the bracket 22 by snap fitting. In this manner, the fuel pump 14, the high-pressure filter 18 and the bracket 22 constitute a fuel pump module.

A sender gauge 30 for detecting the amount of fuel remaining in the fuel tank 10 is mounted on the outer circumference of the filter casing 18*c* (see FIG. 1). The sender gauge 30 has an arm 30*a*, a float 30*b*, and a gauge body 30*c*. The float 30*b* is provided at an end of the arm 30*a* so that the float 30*b* can rotate around the gauge body 30*c*. A resistance value into which the rotation angle of the arm 30*a* is converted is given as an output of the sender gauge 30 to a control circuit 36 outside the fuel tank 10 through a lead cable 32 (see FIG. 2) and the connector 34 which is provided in the bracket 22 and to which the lead cable 32 is connected. Thus, the residual amount of fuel is detected and indicated.

One end of a lead cable 38 is further connected to the connector 34 while the other end of the lead cable 38 is connected to a power supply terminal of the fuel pump 14 for supplying a drive electric source.

Referring to FIGS. 3 through 5, a return pipe 25 for returning surplus fuel to the fuel tank 10 and an tank internal-pressure sensor 40 as well as the fuel pipe 24 and the connector 34 are provided in the bracket 22. The bracket 22 has a recess 22*b* depressed inward from its principal surface to the fuel tank 10 and a lead-in hole 22*c* provided in the bottom of the recess 22*b* and communicating with the fuel tank 10 in order to take in tank internal pressure. An internal pressure lead-in pipe 42*a* of a sensor unit 42 having a semiconductor diaphragm into which an O-ring 44 is fitted is gas-tightly press-fitted and fixed into the lead-in hole 22*c*. After the internal pressure lead-in pipe 42*a* is press-fitted into the lead-in hole 22*c*, power-supply terminals 42*b* and 42*c* and a signal terminal 42*d* (see FIG. 3), which protrude from a side portion of the sensor unit 42, are connected to terminals 34*a*, 34*b*, and 34*c*, respectively by projection welding. The terminals 34*a*, 34*b* and 34*c* are integrally molded with the connector 34 in the bracket 22. Although description has been made upon the case where a semiconductor diaphragm is used, the invention may be also applied to the case where a metal diaphragm, a ceramic diaphragm or the like is used.

Similarly, a temperature sensor such as a thermistor 46 is inserted in a temperature sensor recess 22*d* provided in the bracket 22 and signal terminals 46*a* and 46*b* (see FIG. 5) are connected to terminals 34*d* and 34*a* of the connector 34 by projection welding. The terminal 34*a*, which serves as a ground terminal, is used in common to the sensor unit 42 and the temperature sensor 46.

Incidentally, in FIG. 3, terminals 34*e*, 34*f*, 34*g*, and 34*h* of the connector 34 are used for supplying a drive electric source to the fuel pump 14 and sending out a detection signal of the sender gauge 30.

Next, the tank internal-pressure sensor 40 will be described. Air leakage of a fuel supply system is measured on the basis of the change of the internal pressure of the tank internal-pressure sensor 40 in the condition that the fuel supply system is entirely closed when a vehicle is driven in a predetermined drive mode. The tank internal-pressure sensor 40 is provided for giving a warning to a vehicle driver, for example, by switching on a lamp not shown when a predetermined amount of leaked air is detected.

After the sensor unit 42 and the temperature sensor 46 are attached, a sensor cap 48 having an external air intake hole 48*a* for taking in the external pressure (atmospheric pressure) of the fuel tank 10 is inserted in the recess 22*b*. As a result of the insertion, a leg portion 48*b* of the sensor cap 48 abuts against an upper surface of the sensor unit 42 so that the outer circumferential portion of a plate portion 48*c* of the sensor cap 48 is fitted to a step portion 22*e* of the bracket 22 while the vertical direction of the sensor unit 42 is positioned. In this condition, the outer circumferential portion of the sensor cap 48 and the bracket 22 are gas-tightly fixed to each other by ultrasonic welding, heat welding, or the like. Hence, the upper surface of the bracket 22 and the upper surface of the sensor cap 48 are substantially in one plane. The external air intake hole 48*a* is provided on a side of an upper portion of a lead-in pipe (extension) 48*d*, which is provided as a straight pipe with a closed end. A thin-film fluorine filter 50 permeable to gas but impermeable to water and a contaminating substance is welded to the external air intake hole 48*a*. The external air intake hole 48*a* introduces external air through the thin-film fluorine filter 50. Although description has been made upon the case where the leg portion 48*b* is protruded toward the sensor unit 42, the invention may be also applied to the case where a protrusion is provided on the sensor unit 42 side.

The fuel pipe 24, the return pipe 25 and a connection portion 34*i* surrounding the connector 34 are integrally molded out of an electrically insulating resin such as polyacetal on the bracket 22. The sensor cap 48 is also formed from an electrically insulating resin such as polyacetal.

The sensor unit 42 has a semiconductor diaphragm for receiving internal pressure and external pressure of the fuel tank 10, an amplifying circuit constituted by a monolithic C-MOS IC for amplifying an output of the semiconductor diaphragm, a noise filter circuit constituted by a bipolar IC for reducing noise generated in the semiconductor diaphragm and the amplifying circuit, and terminals 42*b*, 42*c* and 42*d*. The sensor unit 42 is integrally molded out of an electrically insulating resin such as an epoxy resin. Preferably, the amplifying circuit and the semiconductor diaphragm may be constituted by one monolithic C-MOS IC chip, and the noise filter circuit may be constituted by one bipolar IC chip.

The internal pressure of the fuel tank 10 is supplied to one surface of the semiconductor diaphragm through the internal pressure lead-in pipe 42*a*. The external pressure of the fuel tank 10 is supplied to the other surface of the semiconductor diaphragm through the external air intake hole 48*a*. The tank internal-pressure sensor 40 makes the amplifying circuit amplify an output signal based on these pressure and then sends the amplified signal to the control circuit 36. The control circuit 36 calculates the internal pressure of the fuel tank 10 on the basis of the amplified signal. On this occasion, the control circuit 36 also receives a detection signal of the temperature sensor 46 so that the control circuit 36 can detect the internal pressure of the fuel tank 10 in consideration of correction for temperature.

As described above, the sensor unit 42 having the semiconductor diaphragm of the tank internal-pressure sensor 40 is disposed in the inside of the fuel tank 10, that is, in the inside of the fuel tank 10 viewed from the principal surface of the bracket 22. The sectional area of the lead-in pipe 48*d* is sufficiently smaller than the sectional area of the recess 22*b* storing the sensor unit 42. Hence, the plate portion 48*c* (the upper surface of the sensor cap 48) and the principal surface of the bracket 22 are substantially in one plane. The degree of freedom for arrangement of other parts above the bracket 22, such as the fuel pipe 24, the return pipe 25, the connector 34, the lead wires connected between the connector 34 and the control circuit 36, and a breather pipe not disposed in Embodiment 1, is high in comparison with the case according to the related art where the nipple of the tank internal-pressure sensor is inserted and fixed into the bracket from the outside. Particularly, the degree of freedom for arrangement of the fuel pipe 24, the return pipe 25, etc. can be preferably made high because the setting angle of each of these parts often varies in accordance with the kind of the vehicle.

Moreover, because the lead-in pipe 48*d* of the sensor cap 48 is provided as a straight pipe, the degree of freedom for arrangement of other parts above the bracket 22 is high. If the lead-in pipe 48*d* as a straight pipe is removed and the external air intake hole 48*a* is provided substantially in the same plane as the principal surface of the bracket 22, the degree of freedom for arrangement of other parts can be made higher.

Moreover, since the external air intake hole 48*a* is provided in a side of the lead-in pipe 48*d*, water or the like can be preferably prevented from remaining in the external air intake hole 48*a*. Moreover, since the external air intake hole 48*a* is provided in the upper portion of the lead-in pipe 48*d*, the external air intake hole 48*a* can be restrained from being blocked with dust or the like even in the case where dust or the like remains on the upper portion of the bracket 22.

Moreover, since the lead-in pipe 48*d* is protruded from the sensor cap 48, the lead-in pipe 48*d* can be used as a knob so that the sensor cap 48 can be attached to the bracket 22 easily.

Moreover, the outer circumferential portion of the plate portion 48*c* of the sensor cap 48 is welded to the step portion 22*e* of the bracket 22 in the condition that the sensor unit 42 is pressed against the leg portion 48*b* of the sensor cap 48 while the internal pressure lead-in pipe 42*a* of the sensor unit 42 is liquid-tightly sealed with the O-ring 44. Hence, with regard to sealing with respect to the fuel tank 10, positioning can be made easily in comparison with the case according to the related art where the nipple of the tank internal-pressure sensor is fixed to the bracket by thread engagement from the outside through the threaded portion provided in the nipple of the tank internal-pressure sensor. Further, when external force, for example, due to connection of a connector acts on the tank internal-pressure sensor 40, the force acting on the sealing portion (O-ring 44) in the fuel tank 10 is small. Hence, the tank internal-pressure sensor 40 can be simplified in structure.

Moreover, since the recess 22*b* of the bracket 22 serves as a part of the semiconductor diaphragm housing portion of the tank internal-pressure sensor 40, stability of setting of the tank internal-pressure sensor 40 is excellent as well as the number of parts can be reduced.

The number of connectors 34 need not be limited to one. Since terminals 34*a*, 34*b*, 34*c*, 34*d*, 34*e*, 34*f*, 34*g* and 34*h* are provided in the connection portion 34*i* of the connector 34, connection to one connector can be achieved. In this case, mistake about connection can be prevented as well as connection can be made easily.

Since the terminals 34*a*, 34*b*, 34*c* and 34*d* of the connector 34 are integrally molded in the bracket 22, it is unnecessary that lead wires are laid on the outside of the bracket 22 to be connected to the sensor unit 42 and the temperature sensor 46. Hence, the degree of freedom for arrangement of other parts on the upper surface of the bracket 22 is high.

In addition, since the tank internal-pressure sensor 40 is disposed so as to be adjacent to the connector 34, the terminals 34*a*, 34*b*, 34*c* and 34*d* can be shortened.

Embodiment 2

Figure 6:
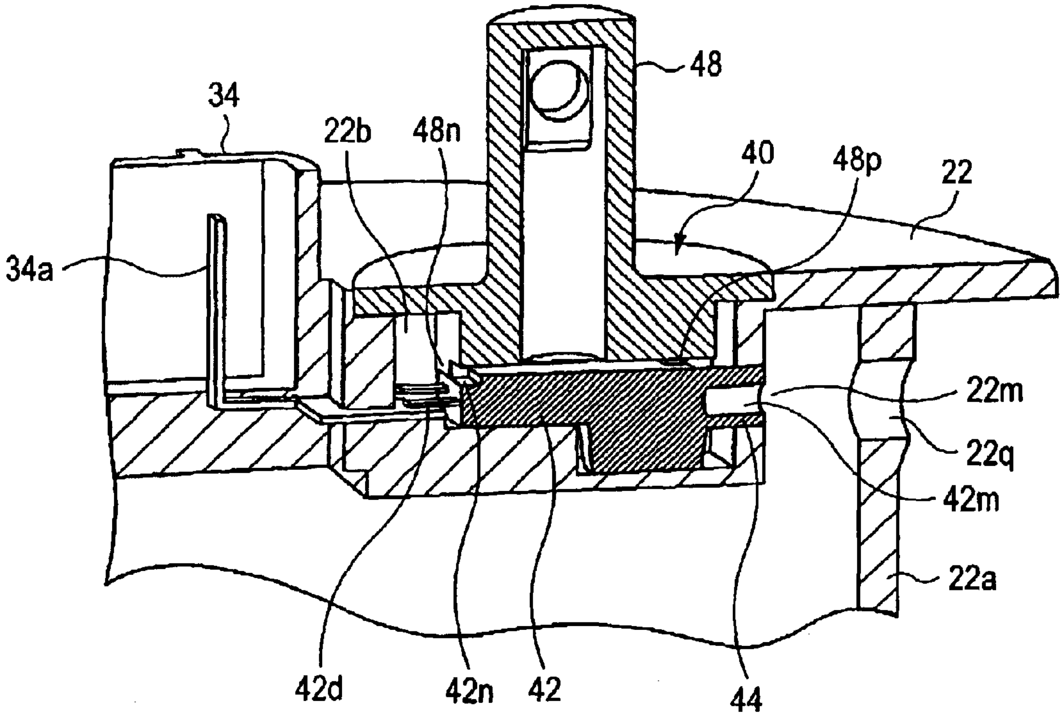
FIG. 6 is a sectional view showing important part of a fuel pump module according to Embodiment 2 of the invention.

Embodiment 2 of the invention will be described below. Although Embodiment 1 has been described upon the case where the internal pressure lead-in pipe 42*a* of the sensor unit 42 is extended downward (downward in FIG. 4) and has an opening facing downward, Embodiment 2 will be described upon the case where the internal pressure lead-in pipe is extended sideward and has an opening facing to a side. FIG. 6 is a sectional view showing a main part of a fuel pump module according to Embodiment 2 of the invention. FIG. 6 is a sectional view mainly showing the bracket cut along the line VI—VI in FIG. 2. The configuration corresponding to that shown in FIGS. 1 to 3 and FIG. 5 is the same as that of Embodiment 1 and description thereof will be therefore omitted.

Referring to FIG. 6, after the sensor unit 42 is inserted in the recess 22*b* of the bracket 22 from above (from above in FIG. 6) so that the lower surface of the sensor unit 42 abuts against the recess 22*b*, the sensor unit 42 is slid right (right in FIG. 6), that is, toward a lead-in hole 22*m* of the bracket 22 so that an internal pressure lead-in pipe 42*m* of the sensor unit 42 having an O-ring 44 is press-fitted into the lead-in hole 22*m*. As a result, the recess 22*b* of the bracket 22 is liquid-tightly sealed with respect to the inside of the fuel tank 10. Then, terminals 42*b*, 42*c*, and 42*d* of the sensor unit 42 are projection-welded to terminals 34*a*, 34*b*, and 34*c*, respectively in the same manner as in Embodiment 1.

Then, leg portions 48*n* and 48*p* of the sensor cap 48 are made to abut against a notch 42*n* and an upper surface of the sensor unit 42, respectively. At this time, a side wall of the leg portion 48*n* is engaged with the notch 42*n* to restrain the sensor unit 42 from moving right and left (right and left in FIG. 6). Then, the outer circumferential portion of the plate portion 48*c* of the sensor cap 48 is gas-tightly sealed with the bracket 22 by ultrasonic welding, in the same manner as in Embodiment 1. An opening 22*q* having an area larger than that of the lead-in hole 22*m* is provided in the flange portion 22*a* of the bracket 22 on an extension line of an axis of the lead-in hole 22*m* provided in the recess 22*b*.

According to the configuration as described above, in addition to Embodiment 1, the internal pressure lead-in pipe 42*m* directly faces the inside of the fuel tank 10 through the opening 22*q*. Hence, the sensor unit 42 can follow the change of the internal pressure of the fuel tank 10 speedily. Moreover, since the internal pressure lead-in pipe 42*m* faces sideward, the opening of the internal pressure lead-in pipe 42*m* can be provided at a high position, that is, at a position near the sensor cap 48 in comparison with the case where the internal pressure lead-in pipe faces downward as shown in Embodiment 1. Hence, fuel entering the internal pressure lead-in pipe 42*m* can be reduced. Moreover, since the opening 22*q* having an area larger than that of the lead-in hole 22*m* is provided in the flange portion 22*a* of the bracket 22 on the extension line of the axis of the lead-in hole 22*m*, fuel entering the internal pressure lead-in pipe 42*m* can be reduced when a large part of a return flow from the pressure regulator 26 returns into the fuel tank 10 through the opening 22*q* for some reason.

Embodiment 3

Figure 7:
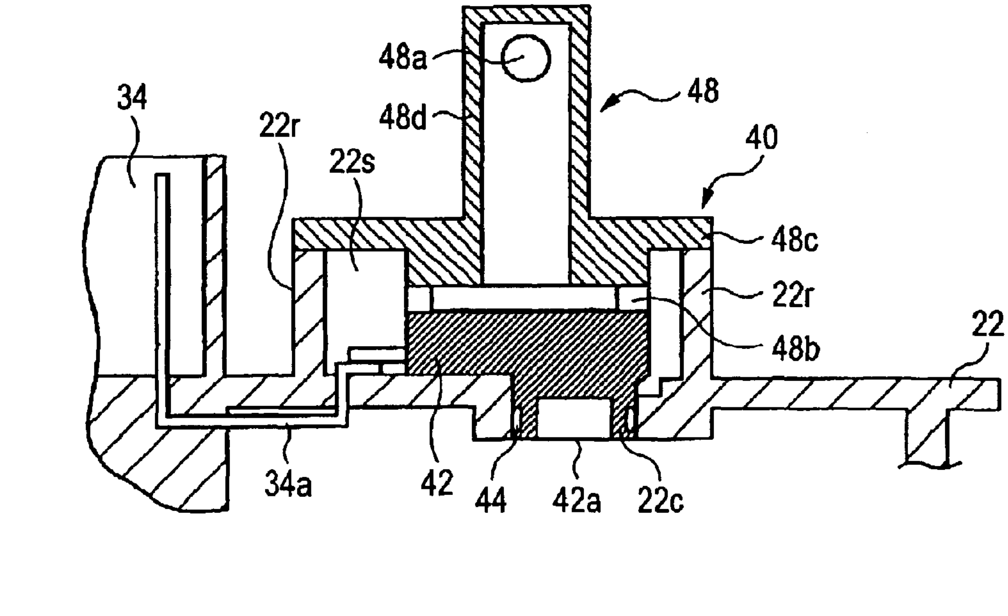
FIG. 7 is a sectional view showing important part of a fuel pump module according to Embodiment 3 of the invention.

Embodiment 3 of the invention will be described below. Embodiment 3 will be described as another example in which the bracket serves as a part of a case for housing the sensor unit. FIG. 7 is a sectional view showing a main part of a fuel pump module according to Embodiment 3 of the invention. The configuration corresponding to that shown in FIGS. 1 to 3 and FIG. 5 is the same as in Embodiment 1 and description thereof will be therefore omitted.

Referring to FIG. 7, a space 22*s* formed by a wall 22*r* extended to the outside of the fuel tank 10 is provided in the bracket 22 in place of the recess 22*b* described in Embodiment 1. In Embodiment 1, the insert-molded terminals 34*a*, 34*b*, 34*c*, and 34*d* of the connector 34 in the bracket 22 are substantially L-shaped in section as shown in FIG. 4. In Embodiment 3, however, the insert-molded terminals 34*a*1, 34*b*1 (not shown), 34*c*1 (not shown) and 34*d*1 (not shown) of the connector 34 in the bracket 22 are substantially U-shaped in section as shown in FIG. 7. Embodiment 3 as to the other configuration is the same as Embodiment 1.

As described above, since the lead-in pipe 48*d* of the sensor cap 48 is provided as a straight pipe, the degree of freedom for arrangement of other parts on the upper surface of the bracket 22 is high. If the lead-in pipe 48*d* provided as a straight pipe is removed and an external air intake hole 48*a* is formed substantially in one and the same plane as the principal surface of the sensor cap 48, the degree of freedom for arrangement of other parts can be made higher.

Moreover, because the external air intake hole 48*a* is provided in a side of the lead-in pipe 48*d*, water or the like can be preferably restrained from remaining in the external air intake hole 48*a*. Moreover, because the external air intake hole 48*a* is provided in an upper portion of the lead-in pipe 48*d*, the external air intake hole 48*a* can be restrained from being blocked with dust or the like even in the case where dust or the like collects on the upper portion of the bracket 22.

Moreover, since the lead-in pipe 48*d* is protruded from the sensor cap 48, the lead-in pipe 48*d* can be used as a knob so that the sensor cap 48 can be attached to the bracket 22 easily.

Moreover, the outer circumferential portion of the plate portion 48*c* of the sensor cap 48 is welded to the step portion 22*e* of the bracket 22 in the condition that the sensor unit 42 is pressed against the leg portion 48*b* of the sensor cap 48 while the internal pressure lead-in pipe 42*a* of the sensor unit 42 is liquid-tightly sealed with the O-ring 44. Hence, with regard to sealing with respect to the fuel tank 10, positioning can be made easily compared with the case in the related art where the nipple of the tank internal-pressure sensor is fixed to the bracket by thread engagement from the outside through the threaded portion provided in the nipple of the tank internal-pressure sensor. Further, when external force, for example, due to connection of a connector acts on the tank internal-pressure sensor 40, the force acting on the sealing portion (O-ring 44) in the fuel tank 10*is* small. Hence, the tank internal-pressure sensor 40 can be simplified in structure.

Moreover, since the wall 22*r* of the bracket 22 serves as a part of the case for housing the tank internal-pressure sensor 40, stability of setting of the tank internal-pressure sensor 40 is excellent as well as the number of parts can be reduced.

The number of connectors 34 need not be limited to one. Since terminals 34*a*, 34*b*, 34*c*, 34*d*, 34*e*, 34*f*, 34*g* and 34*h* are provided in the connection portion 34*i* of the connector 34, connection to one connector can be achieved. In this case, mistake about connection can be prevented as well connection can be made easily.

Moreover, since the terminals 34*a*, 34*b*, 34*c* and 34*d* of the connector 34 are integrally molded in the bracket 22, it is unnecessary that lead wires are laid on the outside of the bracket 22 to be connected to the sensor unit 42 and the temperature sensor 46. Hence, the degree of freedom for arrangement of other parts on the upper surface of the bracket 22 is high.

In addition, since the tank internal-pressure sensor 40 is disposed so as to be adjacent to the connector 34, the terminals 34*a*1, 34*b*1, 34*c*1 and 34*d*1 can be shortened.

Embodiment 4

Figure 8:
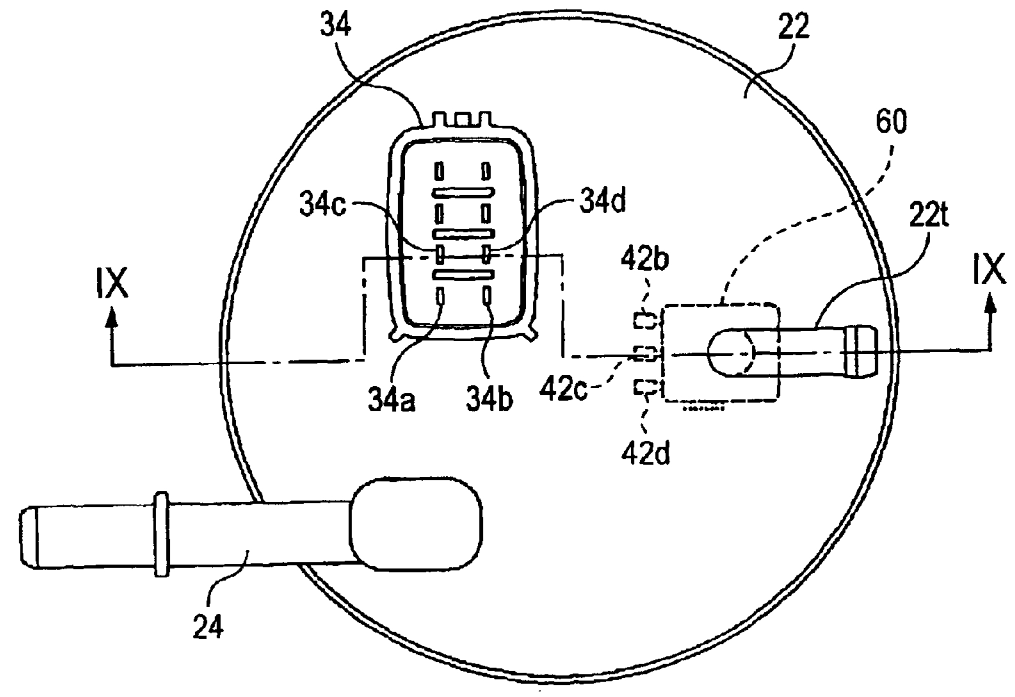
FIG. 8 is a top view of a fuel pump module according to Embodiment 4 of the invention.
Figure 9:
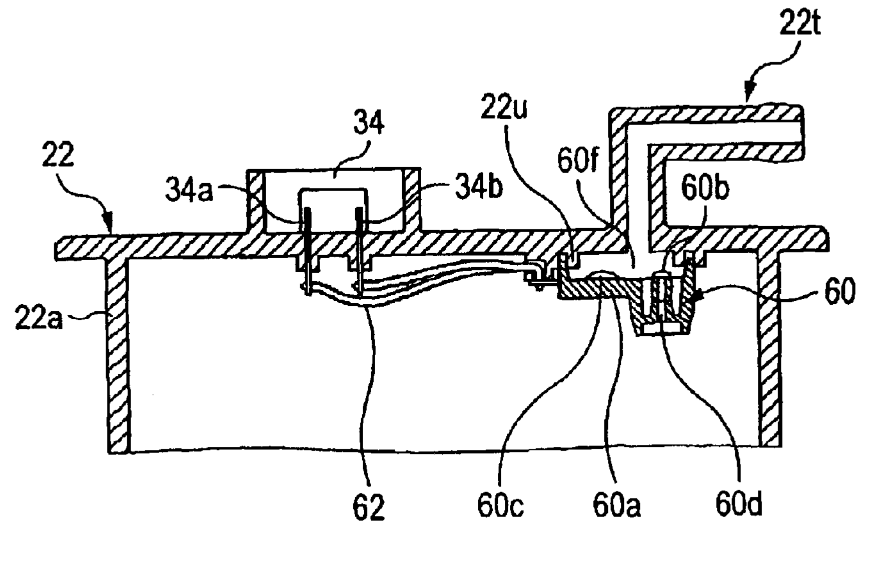
FIG. 9 is a sectional view taken along the line IX—IX in FIG. 8.

Embodiment 4 of the invention will be described below. Embodiment 4 will be described as an example in which the tank internal-pressure sensor is provided in the inside of the bracket in the fuel tank. FIG. 8 is a top view of a fuel pump module according to Embodiment 4 of the invention. FIG. 9 is a sectional view taken along a line IX—IX in FIG. 8. Embodiment 4 is the same as Embodiment 1 except the bracket and the tank internal-pressure sensor, and description thereof will be therefore omitted.

Referring to FIGS. 8 and 9, an external pressure lead-in pipe 22*t* is integrally molded in the bracket 22. A fluorine-based filter may be preferably provided in an opening of the external pressure lead-in pipe 22*t* in the same manner as in Embodiment 1. Further, an end portion of a platform 60*a* is fitted into and ultrasonically welded to a rib 22*u* of the bracket 22 provided in the inside of the fuel tank 10, so that a closed space is formed between the bracket 22 and the platform 60*a*. A semiconductor diaphragm 60*b*, an amplifying circuit and a bipolar IC 60*c* are mounted on the platform 60*a*. The semiconductor diaphragm 60*b* has one end receiving tank internal pressure from an internal pressure lead-in pipe 60*d* communicating with the fuel tank 10 and the other end receiving external pressure from the external pressure lead-in pipe 22*t*. The semiconductor diaphragm 60*b* and the amplifying circuit are constituted by one chip. The bipolar IC 60*c* is constituted by another chip for suppressing noise or the like.

The bracket 22, the platform 60*a*, the semiconductor diaphragm 60*b* and the bipolar IC 60*c* constitute the tank internal-pressure sensor 60. Terminals 42*b*, 42*c*, and 42*d* are provided in the tank internal-pressure sensor 60 and connected to the terminals 34*a*, 34*b*, and 34*c* of the connector 34, respectively, through lead wires 62 from the inside of the fuel tank 10. Incidentally, in Embodiment 4, a temperature sensor is not shown but may be provided together with the semiconductor diaphragm 60*b* in a space 60*f*.

According to the configuration as described above, there can be obtained the same operation and effect as in Embodiment 1 except that the lead-in pipe 48*d* is straight in Embodiment 1 (while the external pressure lead-in pipe 22*t* is substantially L-shaped in Embodiment 4). Since the external pressure lead-in pipe 22*t* is substantially L-shaped, external pressure lead-in directivity can be selected.

In addition, since attachment of the tank internal-pressure sensor 60 is completed by a simple operation of welding the platform 60*a* directly to the bracket 22, workability is excellent.

Embodiment 5

Figure 10:
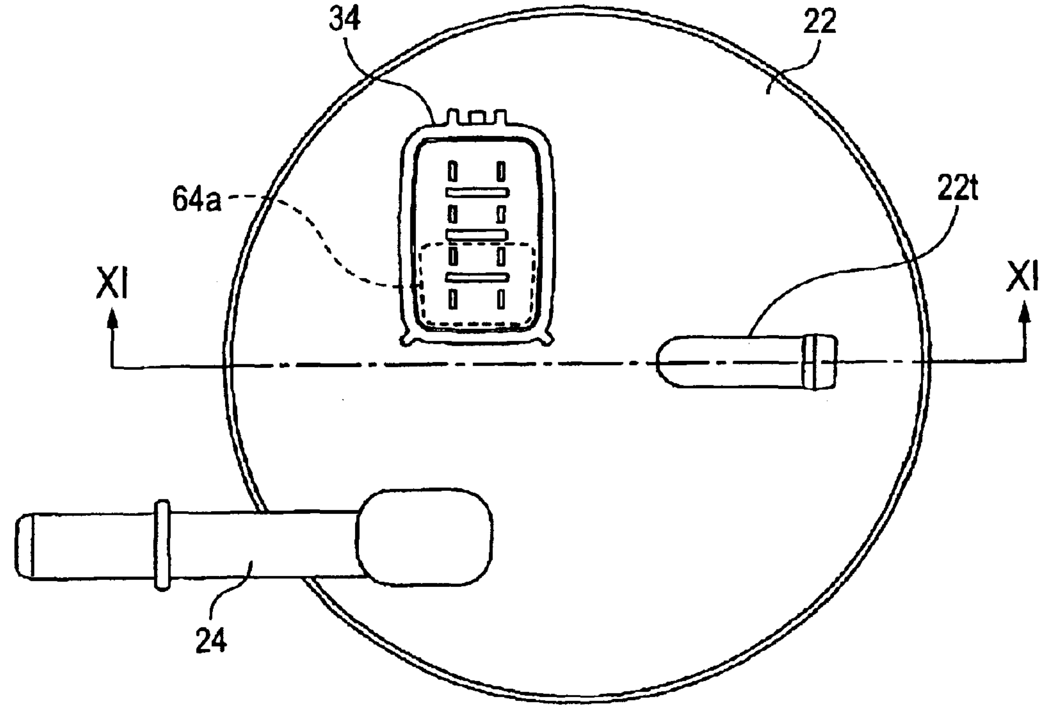
FIG. 10 is a top view of a fuel pump module according to Embodiment 5 of the invention.
Figure 11:
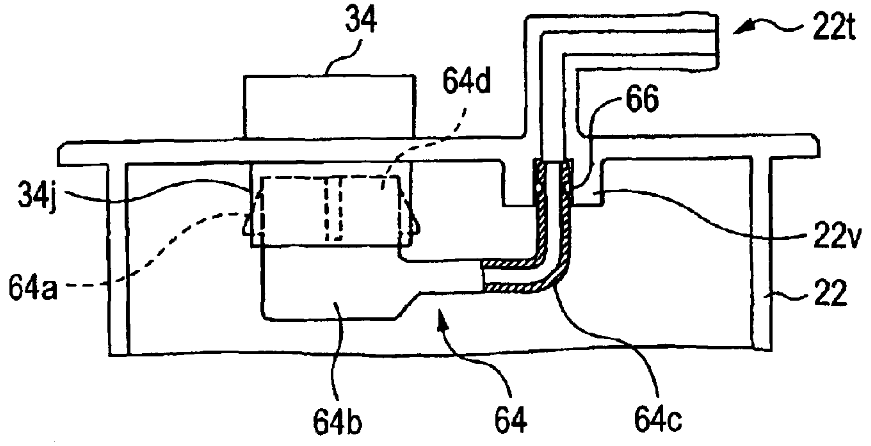
FIG. 11 is a sectional view taken along the line XI-XI in FIG. 8.

Embodiment 5 of the invention will be described below. Embodiment 5 will be described as an example in which the tank internal-pressure sensor is formed as a connector to be connected to the bracket from the inside. FIG. 10 is a top view of a fuel pump module according to Embodiment 5 of the invention. FIG. 11 is a sectional view taken along a line XI—XI in FIG. 10. Embodiment 5 is the same as Embodiment 1 except the bracket and the tank internal-pressure sensor, and description thereof will be therefore omitted.

Referring to FIGS. 10 and 11, the tank internal-pressure sensor 64 has a connector portion 64*a*, an external pressure lead-in passage 64*c*, an internal pressure lead-in pipe 64*d*, and a closed container 64*b*. The connector portion 64*a* is joined to a connection portion 34*j* of the connector 34 extended to the inside of the bracket 22. The external pressure lead-in passage 64*c* is liquid-tightly connected to a rib 22*v* of the external pressure lead-in pipe 22*t* through the O-ring 66. The internal pressure lead-in pipe 64*d* is provided in the connector portion 64*a*. A semiconductor sensor chip, an amplifying circuit and a bipolar IC are contained in the closed container 64*b*.

As described above, since the tank internal-pressure sensor 64 is disposed in the inside of the fuel tank 10, the degree of freedom for arrangement of parts on the upper surface of the bracket 22 can be made high.

In addition, since the tank internal-pressure sensor 64 has the connector portion 64*a* provided in the tank internal pressure sensor 60 and to be joined to the connection portion 34*j* from the inside of the bracket 22, the tank internal-pressure sensor 60 can be attached easily.

Embodiment 6

Figure 12:
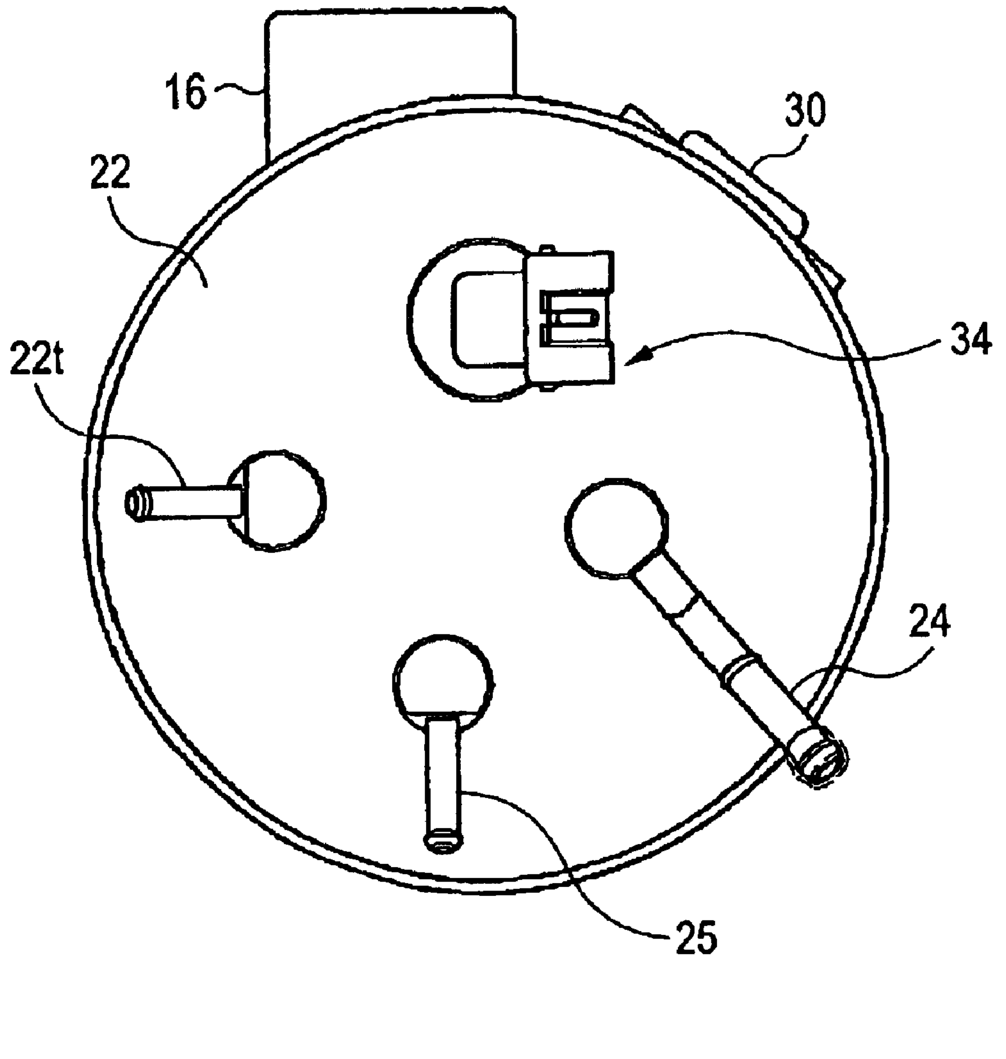
FIG. 12 is a top view of a fuel pump module according to Embodiment 6 of the invention.
Figure 13:
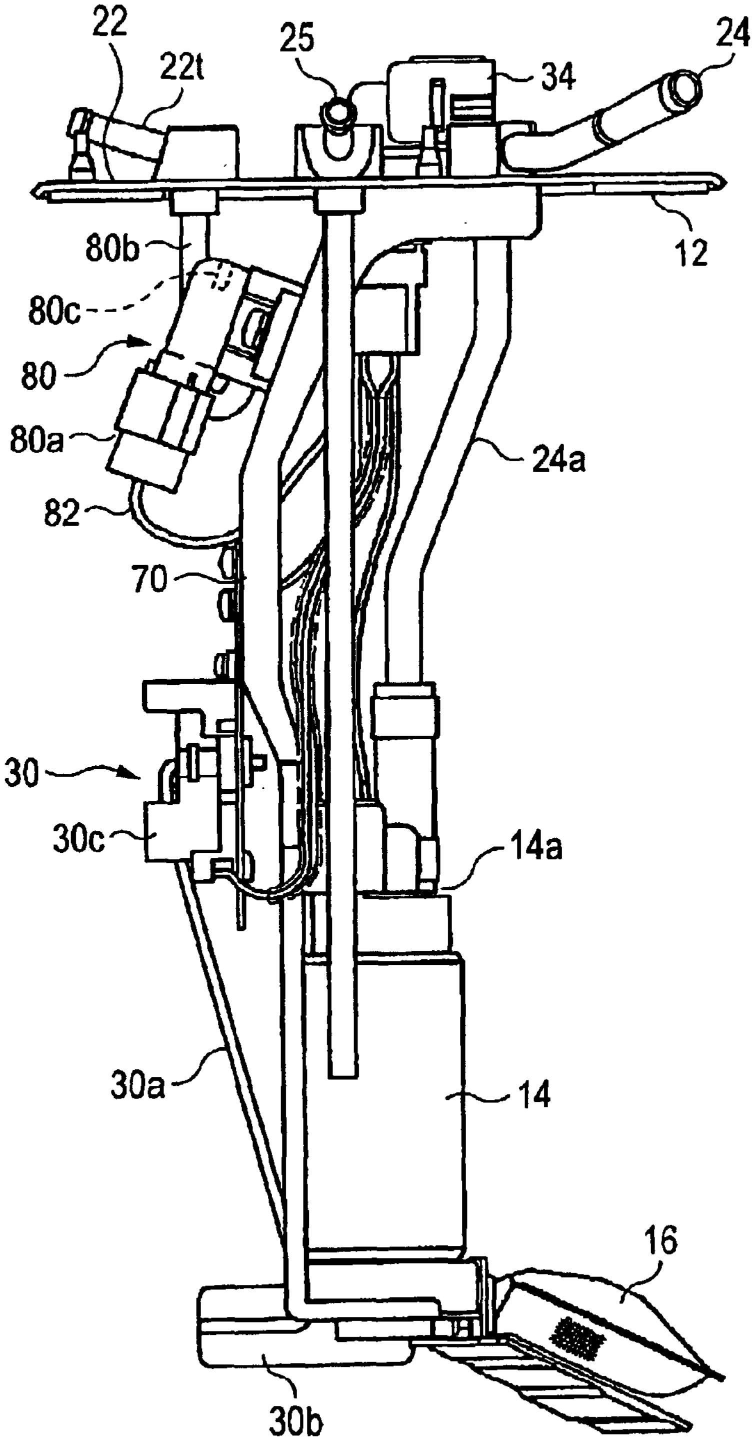
FIG. 13 is a side view of the fuel pump module depicted in FIG. 12.

Embodiment 6 of the invention will be described below. Embodiment 6 will be described as an example in which a fuel pump is held in a plate-like stay and a tank internal-pressure sensor is provided in a fuel tank. FIG. 12 is a top view of a fuel pump module according to Embodiment 6 of the invention. FIG. 13 is a side view of the fuel pump module depicted in FIG.

Referring to FIGS. 12 and 13, a metal stay 70 is attached to a metal bracket 22. The bracket 22 need not be made of metal. If the bracket 22 is made of resin, Embodiment 6 is substantially the same as Embodiment 1. A fuel pump 14 is fixed to the stay 70. A tank internal-pressure sensor 80 is fixed near the bracket 22 (that is, in an upper portion of a fuel tank 10).

Embodiment 6 is different from Embodiment 1 in that the fuel pump module in Embodiment 6 has neither high-pressure fuel filter nor pressure regulator in the fuel tank 10.

When the fuel pump 14 is actuated, fuel is sucked through the suction filter 16. The fuel pressurized by the fuel pump 14 and passed through the inside of the fuel pump 14 goes to an in-tank pipe portion 24*a* of a fuel pipe 24 through an outlet 14*a* of the fuel pump 14. The fuel passed through the in-tank pipe portion 24*a* of the fuel pipe 24 is supplied into an internal combustion engine not shown through the fuel pipe 24.

The tank internal-pressure sensor 80 has a closed container 80*a*, an external pressure passage 80*b*, an internal pressure lead-in pipe 80*c*, and a lead cable 82. A semiconductor diaphragm, an amplifying circuit, a bipolar IC, etc. are contained in the closed container 80*a*. The external pressure passage 80*b* is provided at one end of the closed container 80*a* so as to communicate with the external pressure lead-in pipe 22*t*. The internal pressure lead-in pipe 80*c* is provided in an upper portion of the closed container 80*a* (upper portion in FIG. 13). The lead cable 82 is connected to the connector 34 from the inside of the fuel tank 10.

According to the configuration as described above, the tank internal-pressure sensor 80 may be fixed to the stay 70 by screws or the like. Hence, the tank internal-pressure sensor 80 can be attached to the fuel pump module easily. Embodiment 6 can support a case where the tank internal-pressure sensor 80 is rapidly attached to the fuel pump module after the fuel pump module is mounted in the bracket.

In the fuel pump module and the vehicle tank internal pressure sensor according to the invention, the degree of freedom for arrangement of parts in a space on the upper surface of the bracket blocking the opening of the fuel tank can be made high.

What is claimed is:

1. A fuel pump module comprising:

a bracket for closing an opening of a vehicle fuel tank;

a fuel pump held in the bracket, for sending out fuel stored in the fuel tank; and a tank internal-pressure sensor including:

a diaphragm disposed in an inside of the fuel tank viewed from a principal surface of the bracket, for receiving internal pressure and external pressure of the fuel tank;

a housing portion for housing the diaphragm;

an external pressure lead-in portion having smaller section area than the housing portion, the external lead-in portion for leading the external pressure of the fuel tank into the tank internal-pressure sensor; and a lead-in hole defined in the bracket, for leading one of the external and internal pressures of the fuel tank, wherein the tank internal-pressure sensor detects the internal pressure of the fuel tank on the basis of an output of the diaphragm.

2. The fuel pump module according to claim 1, wherein the tank internal-pressure sensor further includes:

a recess formed in the bracket and depressed toward the inside of the fuel tank so that the diaphragm is contained in the recess, the recess having an internal pressure lead-in hole for leading the internal pressure of the fuel tank into the tank internal-pressure sensor; and a sensor cap closing an opening of the recess and having an external pressure lead-in hole.

3. The fuel pump module according to claim 2, wherein the sensor cap includes:

a plate portion disposed substantially in parallel to a principal surface of the bracket;

the external pressure lead-in hole provided in the external pressure lead-in portion, for leading the external pressure into the sensor cap; and an extension portion extended from the plate portion in a direction of departing from the fuel tank.

4. The fuel pump module according to claim 3, wherein the extension portion is a straight pipe having a closed end; and wherein the external pressure lead-in hole is defined in a side portion near the closed end of the straight pipe.

5. The fuel pump module according to claim 4, wherein the external pressure lead-in hole is closed by a fluorine-based filter.

6. The fuel pump module according to claim 3, wherein the internal pressure lead-in hole is gas-tightly sealed by an internal pressure lead-in passage to the diaphragm and a rubber-like sealing member; and wherein the plate portion is gas-tightly sealed by the bracket.

7. The fuel pump module according to claim 1, wherein the bracket serves as a part of the housing portion of the tank internal-pressure sensor for housing the diaphragm.

8. The fuel pump module according to claim 1, wherein the housing portion for housing the diaphragm is provided in the inside of the fuel tank; and wherein the tank internal-pressure sensor is formed so that the external pressure of the fuel tank is led into the tank internal-pressure sensor through an opening of the bracket.

9. The fuel pump module according to claim 8, wherein the tank internal-pressure sensor is fixed to a member holding the fuel pump.

10. The fuel pump module according to claim 8, wherein a power-supply terminal and a signal terminal of the tank internal-pressure sensor are formed into a connector; and wherein the power-supply terminal and the signal terminal are connected to an insert-molded terminal in the bracket from the inside of the fuel tank.

11. The fuel pump module according to claim 1, wherein an insert-molded terminal in the bracket includes:

a power-supply terminal for supplying drive electric power to the fuel pump; and a terminal to which a power-supply line and a signal line of the tank internal-pressure sensor are connected; and wherein a connector having a protrusion protruded from the bracket to surround the terminals is formed in the bracket.

12. The fuel pump module according to claim 1, wherein an internal pressure lead-in hole for leading the internal pressure of the fuel tank is formed so as to be opened substantially in parallel to a liquid level of the fuel in the fuel tank.

13. The fuel pump module according to claim 1, wherein a member for holding the fuel pump is formed to surround the tank internal-pressure sensor; and wherein an opening having an area larger than that of an internal pressure lead-in hole is formed in a portion of the surrounding member on an extension line of an axis of the internal pressure lead-in hole.

14. The fuel pump module according to claim 2, wherein a temperature sensor for measuring a temperature of the inside of the tank internal-pressure sensor is disposed in the recess.

15. A fuel pump module comprising:

a bracket made of an electrically insulating resin for closing an opening of a vehicle fuel tank, the bracket in which a conductive terminal is insert-molded, the conductive terminal has one end serving as an external connection end;

a fuel pump held in the bracket, for sending out fuel stored in the fuel tank; and a tank internal-pressure sensor including:

a diaphragm for receiving internal pressure and external pressure of the fuel tank;

a power-supply terminal;

a signal terminal; and a lead-in hole defined in the bracket, for leading one of the external and internal pressures of the fuel tank, wherein the power-supply terminal and the signal terminal are connected to the other end of the conductive terminal; and wherein the tank internal-pressure sensor detects the internal pressure of the fuel tank on the basis of an output of the diaphragm.

16. A vehicle fuel tank internal pressure sensor comprising:

a bracket for closing an opening of a vehicle fuel tank; and a tank internal-pressure sensor including:

a diaphragm disposed in an inside of the fuel tank viewed from a principal surface of the bracket, for receiving internal pressure and external pressure of the fuel tank;

a housing portion for housing the diaphragm;

an external pressure lead-in portion having smaller section area than the housing portion, the external lead-in portion for leading the external pressure of the fuel tank into the tank internal-pressure sensor; and a lead-in hole defined in the bracket, for leading one of the external and internal pressures of the fuel tank, wherein the tank internal-pressure sensor detects the internal pressure of the fuel tank on the basis of an output of the diaphragm.

* * * * *